(12) United States Patent
Suzuki

(10) Patent No.: US 9,553,531 B2
(45) Date of Patent: Jan. 24, 2017

(54) POWER CONVERTER

(71) Applicant: DENSO CORPORATION, Kariya, Aichi-pref. (JP)

(72) Inventor: Takashi Suzuki, Kariya (JP)

(73) Assignee: DENSO CORPORATION, Kariya, Aichi-pref (JP)

( * ) Notice: Subject to any disclaimer, the term of this patent is extended or adjusted under 35 U.S.C. 154(b) by 0 days.

(21) Appl. No.: 15/046,180

(22) Filed: Feb. 17, 2016

(65) Prior Publication Data

US 2016/0248350 A1    Aug. 25, 2016

(30) Foreign Application Priority Data

Feb. 19, 2015 (JP) .................................. 2015-30735

(51) Int. Cl.

| | |
|---|---|
| H02P 6/10 | (2006.01) |
| H02P 29/00 | (2016.01) |
| B62D 5/04 | (2006.01) |
| H02P 25/22 | (2006.01) |
| H02P 27/08 | (2006.01) |
| H02M 7/5387 | (2007.01) |

(52) U.S. Cl.
CPC ............. *H02P 6/10* (2013.01); *B62D 5/046* (2013.01); *H02M 7/5387* (2013.01); *H02P 25/22* (2013.01); *H02P 27/08* (2013.01); *H02P 29/0088* (2013.01)

(58) Field of Classification Search
CPC ......... H02M 1/12; H02M 7/487; B62D 5/046; H02P 6/10; H02P 6/14

USPC .......... 318/400.23, 400.01, 400.15, 400.26, 318/400.36, 432, 496
See application file for complete search history.

(56) References Cited

U.S. PATENT DOCUMENTS

| | | | | |
|---|---|---|---|---|
| 8,952,637 B2* | 2/2015 | Suzuki | ................ | H02P 25/22 318/400.01 |
| 2010/0071970 A1* | 3/2010 | Welchko | ................ | B60K 1/00 180/65.1 |
| 2011/0074320 A1* | 3/2011 | Nakamura | ................ | H02P 5/74 318/400.02 |
| 2011/0221375 A1* | 9/2011 | Suzuki | ................ | B62D 5/046 318/496 |
| 2012/0187893 A1* | 7/2012 | Baba | ................ | H02P 25/021 318/722 |

OTHER PUBLICATIONS

U.S. Appl. No. 15/046,173, filed Feb. 17, 2016, Ryo Kano, et al.

* cited by examiner

*Primary Examiner* — Bentsu Ro
*Assistant Examiner* — Thai Dinh
(74) *Attorney, Agent, or Firm* — Knobbe, Martens, Olson & Bear, LLP

(57) ABSTRACT

A power converter that reduces a ripple of a torque and a ripple of an electric current in a switch period, having a controller including an instruction calculator that calculates a first voltage instruction value and a second voltage instruction value when, in a first period, a first neutral point voltage is shifted below a center-of-output value, and a second neutral point voltage is shifted above the center-of-output value, and, in a second period, the first neutral point voltage is shifted above the center-of-output value, and the second neutral point voltage is shifted below the center-of-output value.

8 Claims, 9 Drawing Sheets

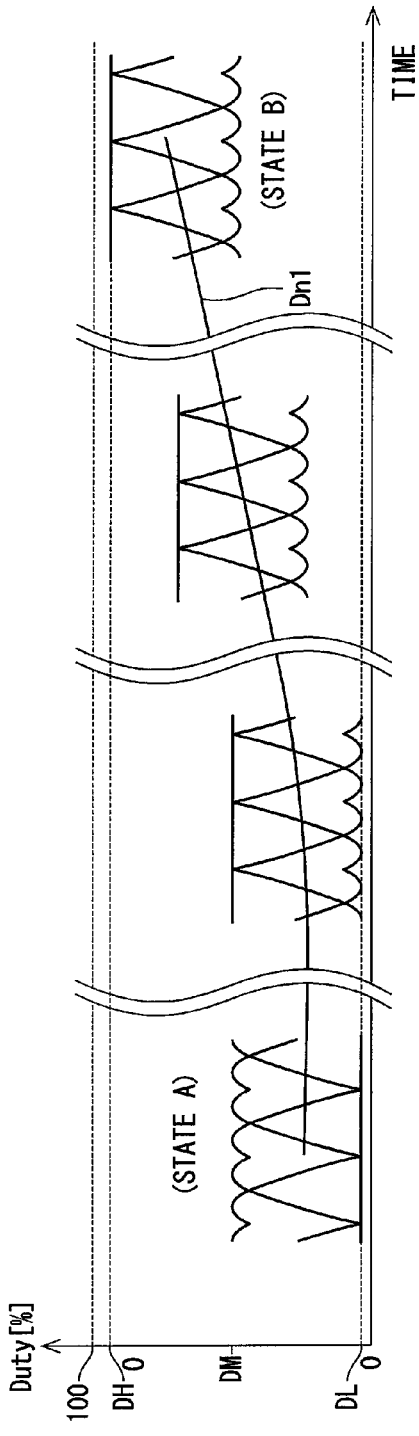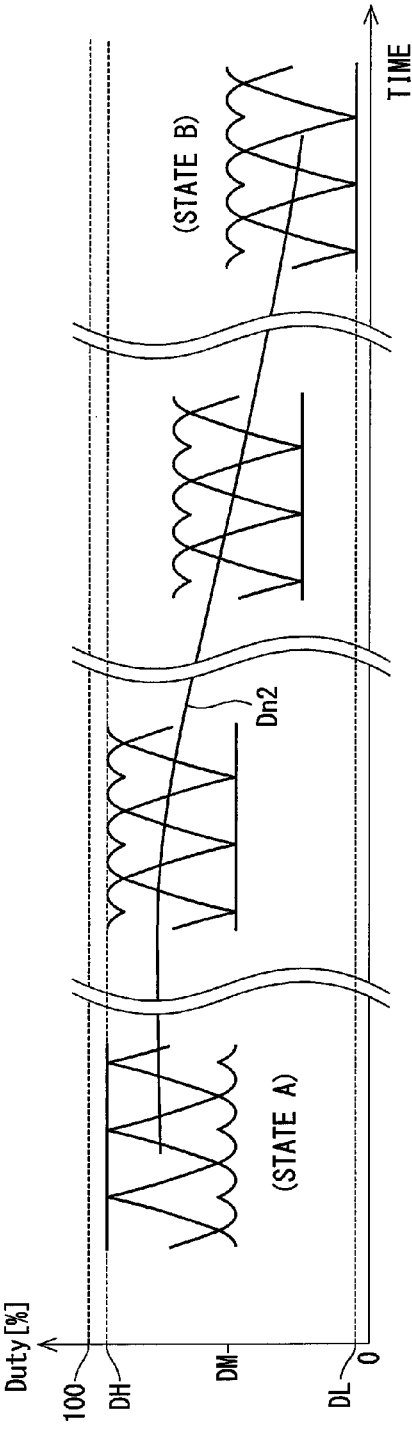

POWER CONVERTER

CROSS REFERENCE TO RELATED APPLICATION

The present application is based on and claims the benefit of priority of Japanese Patent Application No. 2015-030735, filed on Feb. 19, 2015, the disclosure of which is incorporated herein by reference.

TECHNICAL FIELD

The present disclosure generally relates to a power converter for converting an electric power.

BACKGROUND INFORMATION

Conventionally, the power converter for converting an electric power that is supplied to a motor with two sets of winding group is known in the art. For example, in a patent document, JP 2011-188674 A (Patent document 1), for the ease of distribution of heat generation to each of the winding groups, the power converter has two inverters corresponding to two sets of winding group, and the shift direction of the duty instruction signal concerning the drive of each of the inverters is switched at preset intervals.

As disclosed in the patent document 1, when the shift direction of the duty instruction signal is switched, such switching may cause a torque ripple, as well as a vibration and a sound.

SUMMARY

It is an object of the present disclosure to provide a power converter that can reduce the ripple of the torque and/or the ripple of the electric current to be supplied to the motor.

In an aspect of the present disclosure, the power converter of the present disclosure, which converts an electric power supplied to a rotating electric machine that has a first winding group and a second winding group, includes a first inverter, a second inverter, and a controller.

The first inverter has a first switching element respectively corresponding to plural phases in the first winding group.

The second inverter has a second switching element respectively corresponding to plural phases in the second winding group.

The controller includes an instruction calculator. The instruction calculator calculates a first voltage instruction value that is applied to the first winding group, and a second voltage instruction value that is applied to the second winding group.

The instruction calculator calculates the first voltage instruction value and the second voltage instruction value in a voltage instruction switching scheme, for switching between a first period and a second period at a preset switch period when the voltage instruction switching scheme is implemented by the instruction calculator.

During the implantation, (i) in the first period, a first neutral point voltage is shifted downward to be below a center-of-output value of an outputtable voltage range, and a second neutral point voltage is shifted upward to be above the center-of-output value of the outputtable voltage range. Also, (ii) in the second period, the first neutral point voltage is shifted to be above the center-of-output value of the outputtable voltage range, and the second neutral point voltage is shifted to be below the output median value of the outputtable voltage range, so that a time constant of change of each of the first neutral point voltages and second neutral point voltages becomes greater than a preset time constant.

In the present disclosure, switching between the two states (i.e., (i) a state in which the first neutral point voltage is shifted below the center-of-output value, and the second neutral point voltage is shifted above the center-of-output value; and (ii) a state in which the state where the first neutral point voltage is shifted above the center-of-output value, and the second neutral point voltage is shifted below the center-of-output value, is performed). Thereby, the unevenness of heat generation among the switching elements is reduced.

Further, the instruction calculator calculates the first voltage instruction value and the second voltage instruction value so that a time constant of change of each of the first and second neutral point voltages becomes greater than the preset time constant, which is intended to cause a gradual change of the first and second neutral point voltages.

In such manner, the ripple of the electric current accompanying the switching between the first period and the second period is reduced, thereby enabling a reduction of the torque ripple, as well as the reduction of the vibration and the sound.

BRIEF DESCRIPTION OF THE DRAWINGS

Objects, features, and advantages of the present disclosure will become more apparent from the following detailed description made with reference to the accompanying drawings, in which:

FIGS. 4A/B are time diagrams of an outline of a switching of shift directions in the first embodiment of the present disclosure;

DETAILED DESCRIPTION

Hereafter, the power converter of the present disclosure is described based on the drawings. In the following embodiments, like parts have like numbers and the description of the like part is not repeated.

First Embodiment

The power converter in the first embodiment of the present disclosure is described based on FIGS. 1-6.

A power converter 1 of the present embodiment is applied to an electric power steering apparatus 5 for assisting a steering operation performed by the driver with a motor 10, which is also described as a rotating electric machine.

Figure 1:
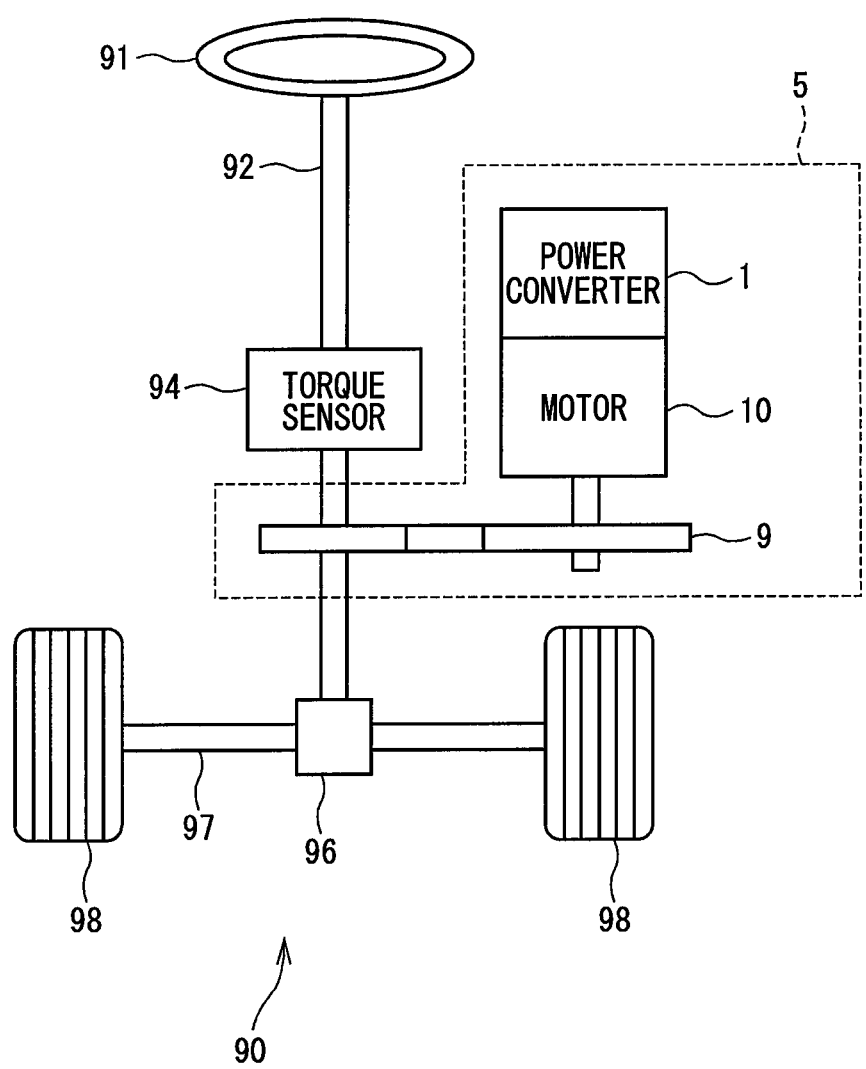
FIG. 1 is a schematic diagram of an electric power steering apparatus in a first embodiment of the present disclosure.

FIG. 1 shows an entire configuration of a steering system 90 provided with the electric power steering apparatus 5.

The steering system 90 comprises a steering wheel (i.e., steering wheel) 91, a steering shaft 92, a pinion gear 96, a rack shaft 97, wheels 98, the electric power steering apparatus 5, and the like.

The steering wheel 91 is connected with the steering shaft 92. On the steering shaft 92, a torque sensor 94 that detects the steering torque inputted to the steering shaft 92 by the driver's operation of the steering wheel 91 is disposed. The pinion gear 96 is disposed at the tip of the steering shaft 92, and the pinion gear 96 engages with the rack shaft 97. A pair of wheels 98 are connected with both ends of the rack shaft 97 via a tie rod, etc.

Thereby, when the driver rotates the steering wheel 91, the steering shaft 92 connected to the steering wheel 91 rotates. The rotational movement of the steering shaft 92 is turned into the linear movement of the rack shaft 97 by the pinion gear 96, and the wheels 98 are steered by an angle according to the amount of displacement of the rack shaft 97.

The electric power steering apparatus 5 has a motor 10 that outputs an assist torque for assisting a steering operation of the steering wheel 91 by the driver, a power converter 1 for a drive control of the motor, a speed reduction gear 9 that reduces a rotation speed of the motor 10 for outputting the rotation to the steering shaft 92 or to the rack shaft 97, and the like.

Figure 2:
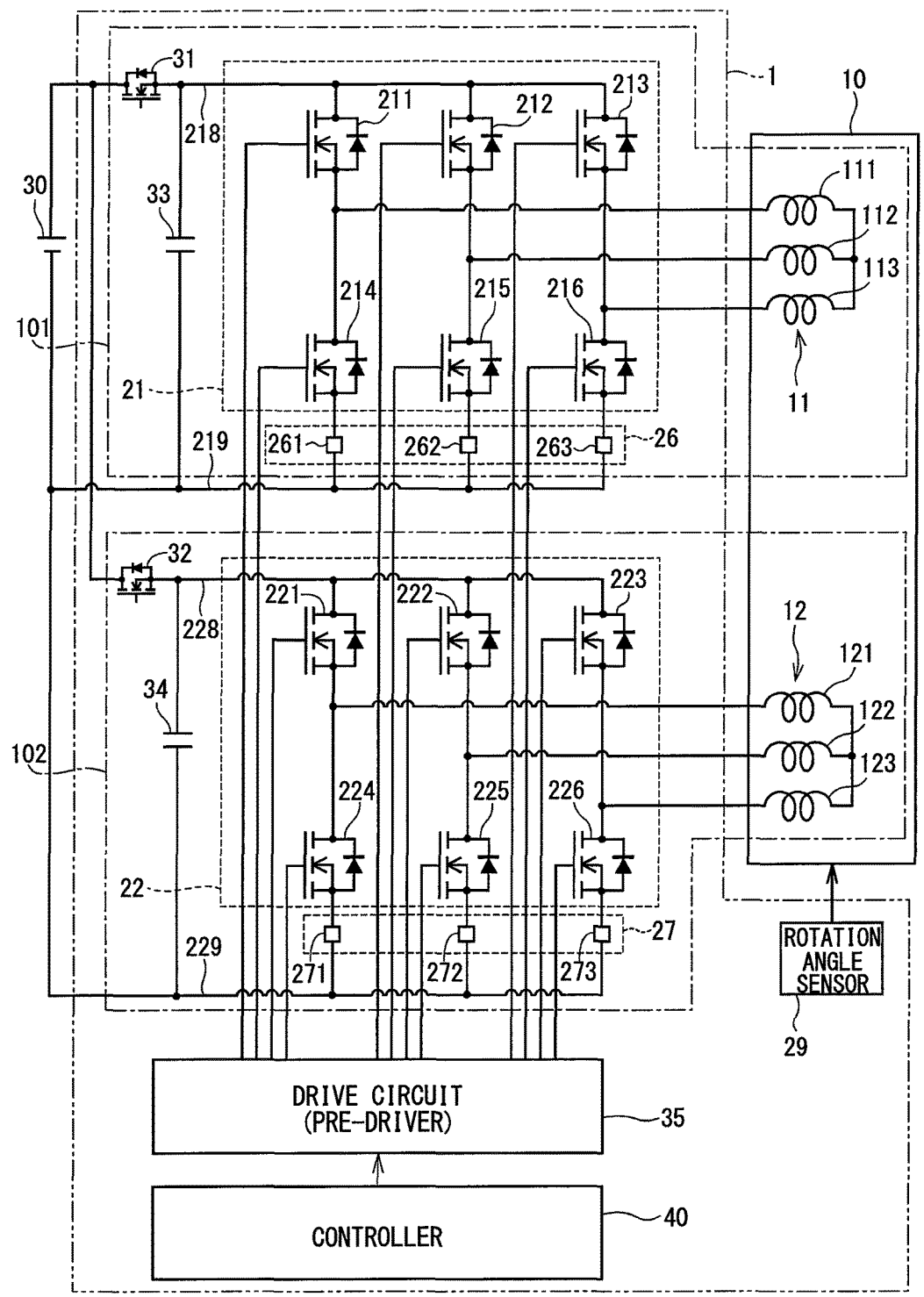
FIG. 2 is a circuit diagram of the electric constitution of a power converter in the first embodiment of the present disclosure.

The motor 10 is driven by receiving a supply of an electric power from a battery 30 (refer to FIG. 2), which is a direct-current power supply, and rotates the speed reduction gear 9 back and forth (i.e., reciprocally). As shown in FIG. 2, the motor 10 is a three-phase brushless motor, and has a rotor and a stator (not illustrated). The rotor is a cylindrical component, and the permanent magnet is attached on the surface, and has the magnetic pole. The stator has winding groups 11 and 12 wound on the stator. The first winding group 11 comprises a U1 coil 111, a V1 coil 112, and a W1 coil 113. The second winding group 12 comprises a U2 coil 121, a V2 coil 122, and a W2 coil 123.

The power converter 1 includes a first inverter 21, a second inverter 22, a first current detector 26, a second current detector 27, a rotation angle sensor 29, a first power relay 31, a second power relay 32, a first capacitor 33, a second capacitor 34, a drive circuit (pre-driver) 35, a controller 40 and the like.

The first inverter 21 has six first switching elements 211-216 (the "switching element" may hereafter be designated as the "SW element"), and switches the power supply to the coils 111, 112, and 113 of the first winding group 11.

The drain of high potential side SW elements 211, 212, and 213 that are provided on the high potential side is respectively connected with the positive electrode of the battery 30 via a first high side bus line 218.

The source of the high potential side SW elements 211, 212, and 213 is respectively connected with the drain of the low potential side SW elements 214, 215, and 216 that are provided on the low potential side.

The source of low potential side SW elements 214, 215, and 216 is respectively connected with the negative electrode of the battery 30 via a first low side bus line 219.

The junction point of the high potential side SW elements 211, 212, and 213 and the low potential side SW elements 214, 215, and 216 is respectively connected with one end of the U1 coil 111, the V1 coil 112, and the W1 coil 113, respectively.

The second inverter 22 has six second SW elements 221-226, and switches the power supply to the coils 121, 122, and 123 of the second winding group 12.

The drain of high potential side SW elements 221, 222, and 223 is respectively connected with the positive electrode of the battery 30 via a second high side bus line 228.

The source of high potential side SW elements 221, 222, and 223 is respectively connected with the drain of the low potential side SW elements 224, 225, and 226.

The source of low potential side SW elements 224, 225, and 226 is respectively connected with the negative electrode of the battery 30 via a second low side bus line 229.

The junction point of the high potential side SW elements 221, 222, and 223 and the low potential side SW elements 224, 225, and 226 is respectively connected with one end of the U2 coil 121, the V2 coil 122, and the W2 coil 123, respectively.

Although the SW elements 211-216, 221-226 of the present embodiment are all Metal Oxide Field Effect Transistors (MOSFET), Insulated Gate Bipolar Transistor (IGBT), a thyristor, etc., may also be used as the SW elements.

The first current detector 26 comprises current detection elements 261, 262, and 263.

The current detection element 261 is disposed on the low potential side of the SW element 214, and detects the electric current supplied to the U1 coil 111. The current detection element 262 is disposed on the low potential side of SW element 215, and detects the electric current supplied to the V1 coil 112. The current detection element 263 is disposed on the low potential side of SW element 216, and detects the electric current supplied to the W1 coil 113. The electric current detection values that are detected by the first current detector 26 concerning the electric current supplied to the respective phases of the first winding group 11 are hereafter designated as first current detection values Iu1, Iv1, and Iw1.

The second current detector 27 comprises current detection elements 271, 272, and 273.

The current detection element 271 is disposed on the low potential side of SW element 224, and detects the electric current supplied to the U2 coil 121. The current detection element 272 is disposed on the low potential side of SW element 225, and detects the electric current supplied to the V2 coil 122. The current detection element 273 is disposed on the low potential side of SW element 226, and detects the electric current supplied to the W2 coil 123. The electric current detection values that are detected by the second current detector 27 concerning the electric current supplied to the respective phases of the second winding group 12 are hereafter designated as second current detection value Iu2, Iv2, and Iw2.

The current detection elements 261-263, 271-273 of the present embodiment are shunt resistors.

The rotation angle sensor 29 detects the rotation angle of the motor 10. An electrical angle θ of the motor 10 detected by the rotation angle sensor 29 is outputted to the controller 40.

The first power relay 31 can intercept the electric power supply from the battery 30 to the first inverter 21. Also, the second power relay 32 can intercept the electric power supply from the battery 30 to the second inverter 22. Although the power relays 31 and 32 are the same MOSFET as SW element 211 and the like, the power relays 31, 32 may also be IGBT, mechanical relays, or the like.

Further, when the power relays 31 and 32 are implemented as MOSFET, etc., it is preferable to use a reverse connection protection relay (not illustrated) that is connected in series with the power relays 31 and 32 for the protection of the power relays 31, 32 due to an accidental reverse connection of the battery 30 or the like.

The first capacitor 33 is connected in parallel with the battery 30 and the first inverter 21. The second capacitor 34 is connected in parallel with the battery 30 and the second inverter 22.

The capacitors 33 and 34 assist the supply of the electric power to the inverters 21 and 22, or control the noise components (e.g. the surge current), by storing electric charge.

In the present embodiment, the first winding group 11, the first inverter 21, the first current detector 26, the first power relay 31, and the first capacitor 33 for the control of the power supply to the first winding group 11 are collectively designated as a "first system 101"; and the second winding group 12, the second inverter 22, the second current detector 27, the second power relay 32, and the second capacitor 34 for the control of the power supply to the second winding group 12 are collectively designated as a "second system 102". In the following, the number "1" may be used as an index of the component involving a control of the first system 101, and the number "2" may be used as an index of the component involving a control of the second system 102.

The controller 40 conducts a control of the power converter 1 as a whole, and is constituted by a microcomputer, etc., which perform various operations and calculations. Each process in the controller 40 may be a software process by an execution of a program memorized in advance by a Central Processing Unit (CPU), or may be a hardware process realized by an electronic circuit that is dedicated to such process.

The controller 40 generates a control signal that controls ON and OFF switching of the SW elements 211-216, 221-226, based on the steering torque obtained from the torque sensor 94, the electrical angle θ obtained from the rotation angle sensor 29, etc. The generated control signal is outputted to the gate of the SW elements 211-216, 221-226 via the drive circuit (pre-driver) 35.

Figure 3:
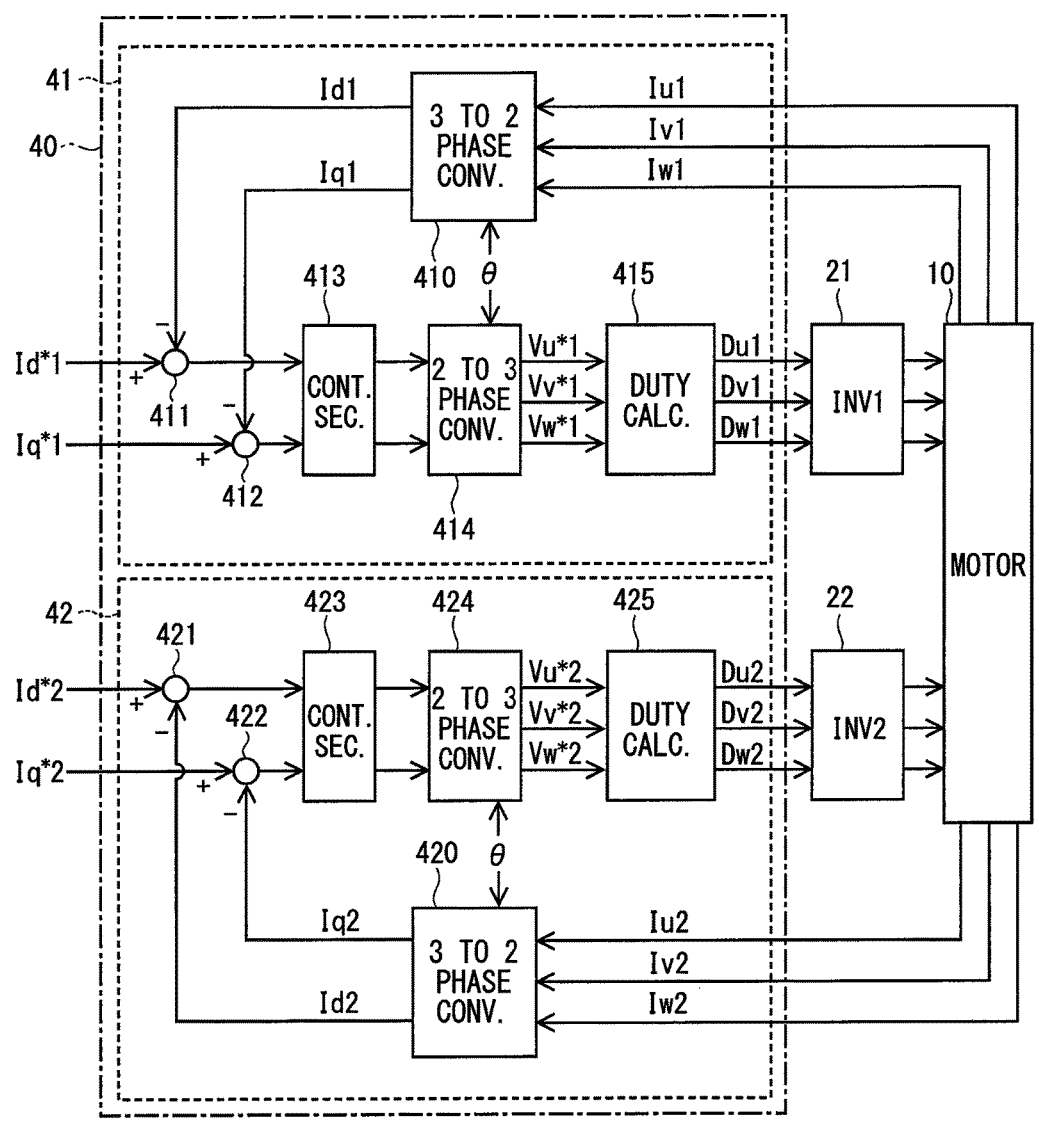
FIG. 3 is a block diagram of a controller in the first embodiment of the present disclosure.

As shown in FIG. 3, the controller 40 has a first instruction calculator 41 concerning a control of the first system 101, and a second instruction calculator 42 concerning a control of the second system 102. Since the function block of the first instruction calculator 41 to which a number 41$x$ is assigned, and the function block of the second instruction calculator 42 to which a number 42$x$ is assigned are basically the same (e.g., 411=421), only the function blocks 41$x$ are described in the following.

The first instruction calculator 41 includes a 3-to-2 phase converter 410, subtracters 411 and 412, a control section 413, a 2-to-3 phase converter 414, and a duty calculator 415.

The 3-to-2 phase converter 410 performs, based on the electrical angle θ, a dq conversion on the electric current detection values Iu1, Iv1, and Iw1, which are detected by the first current detector 26 and corrected in terms of an offset error, a gain error, etc., and calculates a d axis electric current detection value Id1 and a q axis electric current detection value Iq1.

The d axis subtracter 411 calculates a d axis electric current deviation ΔId1, which is a deviation between a d axis electric current instruction value Id*1, and the d axis electric current detection value Id1. The q axis subtracter 412 calculates a q axis electric current deviation ΔIq1, which is a deviation between a q axis electric current command value Iq*1, and the q axis electric current detection value Iq1. The control section 413 calculates a d axis voltage instruction value Vd*1, and a q axis voltage instruction value Vq*1 by a PI calculation, etc., so that the electric current deviations ΔId1 and ΔIq1 respectively converge to zero.

The 2-to-3 phase converter 414 performs, based on the electrical angle θ, an inverted dq conversion of the d axis voltage instruction value Vd*1 and the q axis voltage instruction value Vq*1, and calculates voltage instruction values Vu*1, Vv*1, and Vw*1.

The duty calculator 415 calculates duty instruction values Du1, Dv1, and Dw1, based on the voltage instruction values Vu*1, Vv*1, and Vw*1.

A duty calculator 425 of the second instruction calculator 42 calculates duty instruction values Du2, Dv2, and Dw2, based on the voltage instruction values Vu*2, Vv*2, and Vw*2.

Hereafter, the calculation of the first duty instruction values Du1, Dv1, Dw1, which are instructions concerning a control of the first inverter 21, and the calculation of the second duty instruction values Du2, Dv2, Dw2, which are instructions concerning a control of the second inverter 22, are respectively described in full details.

In the present embodiment, based on a first neutral point voltage Vn1, which is a neutral point voltage of the voltages Vu1, Vv1, Vw1 applied to the first winding group 11 and a second neutral point voltage Vn2, which is a neutral point voltage of the voltages Vu2, Vv2, Vw2 applied to the second winding group 21, the duty instruction values Du1, Dv1, Dw1, Du2, Dv2, Dw2 are calculated so that one of the Vn1 and the Vn2 is shifted above a center-of-output value VM that is a center value of an outputtable voltage range, and the other of the Vn1 and the Vn2 is shifted below the center-of-output value VM.

By shifting one of the first neutral point voltage Vn1 and the second neutral point voltage Vn2 above the center-of-output value VM, which is the center value of the outputtable voltage range while shifting the other below the value VM, a generation timing of a zero voltage vector and an effective voltage vector in the first inverter 21 is shifted from a generation timing of a zero voltage vector and an effective voltage vector in the second inverter 22. Thereby, a ripple electric current from the capacitors 33 and 34 is reduced.

According to the present embodiment, the duty calculator 415 performs a modulation process on the voltage instruction values Vu*1, Vv*1, and Vw*1, and calculates the first duty instruction values Du1, Dv1, and Dw1.

The duty calculator 425 performs the modulation process of the voltage instruction value Vu*2, Vv*2, and Vw*2, and calculates the second duty instruction values Du2, Dv2, and Dw2.

Here, the modulation process is described.

According to the present embodiment, a "low-end set modulation process" is defined as a modulation process in which one of the smallest among the first duty instruction values Du1, Dv1, and Dw1 is set to a preset value. Similarly, the "low-end set modulation process" is defined as a modulation process in which one of the smallest among the second duty instruction values Du2, Dv2, and Dw2 is set to a preset value. In the present embodiment, a low-end set modulation process for setting a duty of the smallest phase to a lower limit value DL of the outputtable range is designated as a "lower limit low-end set modulation process."

Further, a "high-end set modulation process" is defined as a modulation process in which one of the highest among the first duty instruction values Du1, Dv1, and Dw1 is set to a preset value. Similarly, the "high-end set modulation process" is defined as a modulation process in which one of the highest among the second duty instruction values Du2, Dv2, and Dw2 is set to a preset value.

In the present embodiment, a high-end set modulation process for setting a duty of the greatest phase to an upper limit value DH of the outputtable range is designated as an "upper limit high-end set modulation process."

By performing the modulation process, the voltage use efficiency is improved.

According to the present embodiment, one of two groups of the instruction values (i.e., the first duty instruction values Du1, Dv1, Dw1 and the second duty instruction values Du2, Dv2, Dw2) undergo the low-end set modulation process, and the other undergo the high-end set modulation process.

When the first duty instruction values Du1, Dv1, and Dw1 undergo the lower limit low-end set modulation process, and the second duty instruction values Du2, Dv2, and Dw2 undergo the upper limit high-end set modulation process, the first neutral point voltage Vn1 is shifted below the center-of-output value VM, and the second neutral point voltage Vn2 is shifted above the center-of-output value VM.

When the first duty instruction values Du1, Dv1, and Dw1 undergo the upper limit high-end set modulation process, and the second duty instruction values Du2, Dv2, and Dw2 undergo the lower limit low-end set modulation process, the first neutral point voltage Vn1 is shifted above the center-of-output value VM, and the second neutral point voltage Vn2 is shifted below the center-of-output value VM.

According to the present embodiment, the lower limit value DL and the upper limit value DH of the outputtable range are respectively set as a value between 0 [%]-100 [%] in consideration of time required for detecting the electric current by electric current detectors 26 and 27 and other factors.

According to the present embodiment, the lower limit value DL is set to 4 [%] and the upper limit value DH is set to 93 [%]. Further, a duty conversion value of the center-of-output value VM is designated as a center-of-output duty DM. The center-of-output duty DM is set to 50 [%].

When the first neutral point voltage Vn1 is shifted below the center-of-output value VM, in the first inverter 21, a longer ON period occurs for the low potential side SW elements 214-216 than for the high potential side SW elements 211-213.

Similarly, when the second neutral point voltage Vn2 is shifted below the center-of-output value VM, in the second inverter 22, a longer ON period occurs for the low potential side SW elements 224-226 than for the high potential side SW elements 221-223.

When the first neutral point voltage Vn1 is shifted above the center-of-output value VM, in the first inverter 21, a longer ON period occurs for the high potential side SW elements 211-213 than for the low potential side SW elements 214-216.

Similarly, when the second neutral point voltage Vn2 is shifted above the center-of-output value VM, in the second inverter 22, a longer ON period occurs for the high potential side SW elements 221-223 than for the low potential side SW elements 224-226.

Therefore, in the present embodiment, in order to prevent overheating of a part of the SW elements 211-216, 221-226, two states (i.e., a first state in which the first neutral point voltage Vn1 is shifted downward and the second neutral point voltage Vn2 is shifted upward, and a second state in which the first neutral point voltage Vn1 is shifted upward and the second neutral point voltage Vn2 is shifted downward) are switched. Thereby, generation of heat from the SW elements 211-216, 221-226 is distributed among two systems 101 and 102.

In the present embodiment, one of the two duty instruction value groups (i.e., either the first duty instruction values Du1, Dv1, Dw1 or the second duty instruction values Du2, Dv2, Dw2) undergoes the lower limit low-end set modulation process, and the other of the two instruction value groups undergoes the upper limit high-end set modulation process. This enables a control in which one of the first neutral point voltage Vn1 and the second neutral point voltage Vn2 comes above the center-of-output value VM, and the other of the Vn1 and Vn2 comes below the VM.

Now, assuming that, in a state A, the first duty instruction values Du1, Dv1, Dw1 undergo the lower limit low-end set modulation process, and the second duty instruction values Du2, Dv2, Dw2 undergo the upper limit high-end set modulation process, and, in a state B, the first duty instruction values Du1, Dv1, Dw1 undergo the upper limit high-end set modulation process and the second duty instruction values Du2, Dv2, Dw2 undergo the lower limit low-end set modulation process. Here, a direct switching from one of the state A and the state B to the other may cause a torque ripple, along with vibration and noise.

Therefore, in the present embodiment, the duty calculator 415 calculates and applies, when switching from one of the state A and the state B to the other, the duty instruction values Du1, Dv1, Dw1, Du2, Dv2, and Dw2 so that the change of the neutral point voltages Vn1 and Vn2 becomes greater than a preset time constant. The application of the duty instruction values Du1, Dv1, Dw1, Du2, Dv2, and Dw2 reduces the ripple of the electric current caused by the above-described switching.

Transition of the duty instruction values Du1, Dv1, Dw1, Du2, Dv2, and Dw2 is shown in FIGS. 4A/B.

In FIG. 4A, an outline of the first duty instruction values Du1, Dv1, and Dw1 is shown, and, in FIG. 4B, an outline of the second duty instruction values Du2, Dv2, and Dw2 is shown.

FIGS. 4A/B are only for an illustration of the switching of the shift directions, and are not necessarily in agreement with the actual transition of the duty and/or the neutral point voltage.

Hereafter, the duty conversion value of the first neutral point voltage Vn1 is designated as a first neutral point voltage conversion value Dn1 and the duty conversion value of the second neutral point voltage Vn2 is designated as a second neutral point voltage conversion value Dn2.

As shown in FIG. 4A, when switching from the state A to the state B, while the duty of the smallest phase is set to the lower limit value DL, the first duty instruction values Du1, Dv1, and Dw1 are switched from the low-end set modulation to the high-end set modulation. At such timing, the duty of the greatest phase becomes a value smaller than the upper limit value DH.

The first duty instruction values Du1, Dv1, and Dw1 are then gradually shifted upward until the duty of the greatest phase reaches the upper limit value DH. Thereby, the first neutral point voltage conversion value Dn1 gradually increases.

As shown in FIG. 4B, when switching from the state A to the state B, while the duty of the greatest phase is set to the upper limit value DH, the second duty instruction values Du2, Dv2, and Dw2 are switched from the high-end set modulation to the low-end set modulation. At such timing, the duty of the smallest phase becomes a value greater than the lower limit value DL.

The second duty instruction values Du2, Dv2, and Dw2 are then gradually shifted downward until the duty of the smallest phase reaches the lower limit value DL. Thereby, the second neutral point voltage conversion value Dn2 gradually decreases.

When switching from the state B to the state A, the first duty instruction values Du1, Dv1, and Dw1 are shifted as shown in FIG. 4B, and the second duty instruction values Du2, Dv2, and Dw2 are shifted as shown in FIG. 4A.

When switching from the state A to the state B, however, the first duty instruction values Du1, Dv1, and Dw1 may be shifted upward by the low-end set modulation (i.e., without switching to the high-end set modulation as described above). When (i.e., after) the duty of the greatest phase reaches the upper limit value DH, the low-end set modulation may be switched to the high-end set modulation. Further, the second duty instruction values Du2, Dv2, and Dw2 are shifted downward by the high-end set modulation (i.e., without switching to the low-end set modulation). When (i.e., after) the duty of the smallest phase reaches the lower limit value DL, the high-end set modulation may be switched to the low-end set modulation. The same applies to the switching from the state B to the state A.

Figure 5:
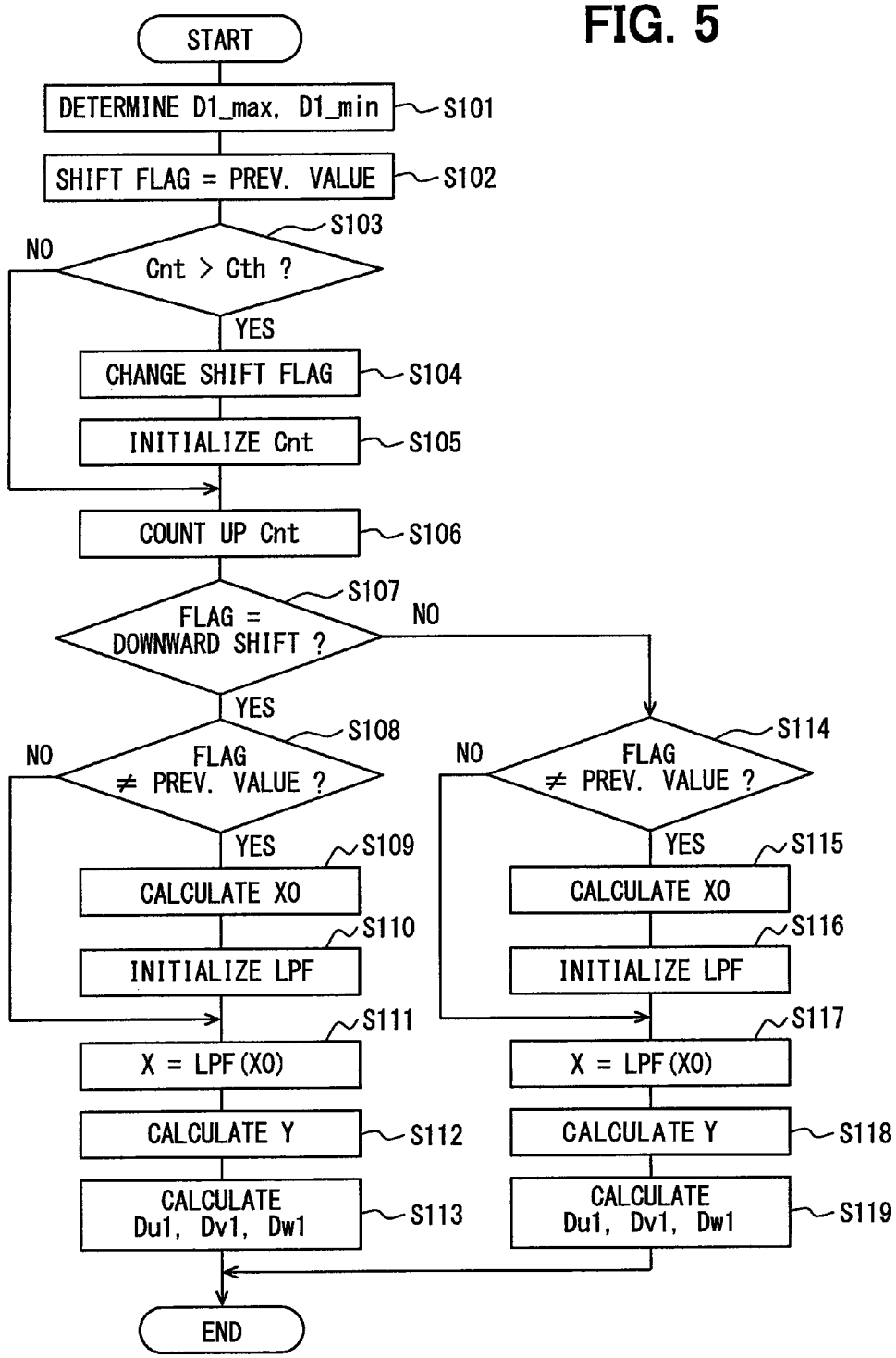
FIG. 5 is a flowchart of an instruction calculation process in the first embodiment of the present disclosure.

An instruction calculation process of the present embodiment is described based on the flowchart in FIG. 5. The process of FIG. 5 is performed at predetermined intervals by the duty calculator 415.

FIG. 5 describes the calculation of the first duty instruction values Du1, Dv1, and Dw1. The description of the calculation of the second duty instruction values Du2, Dv2, and Dw2 is omitted since the calculation of the second duty instruction values Du2, Dv2, and Dw2 is the same as the first duty instruction values Du1, Dv1, and Dw1.

In the first step(S) S101, among pre-modulation duty instruction values Du1_b, Dv1_b, Dw1_b, which are the duty conversion values of the voltage instruction values Vu*1, Vv*1, and Vw*1, the largest value is designated as "D1_max," and the smallest value is designated as "D1_min."

In S102, a shift flag is set to a "previous value."

In S103, it is determined whether a count value Cnt of a counter, which counts time from the start of switching of the shift directions is greater than a count determination value Cth, which is a predetermined count value representing a switch period Pc.

When the count value Cnt is determined to be equal to or less than the count determination value Cth (i.e., when the switch period Pc has not passed after the start of switching of the shift directions) (S103: NO), the process proceeds to S106. The shift flag is maintained as the previous value at such time.

When it is determined that the count value Cnt is greater than the count determination value Cth (i.e., when the switch period Pc has passed after the start of switching of the shift directions) (S103: YES), the process proceeds to S104.

The shift flag is changed in S104. More practically, when the previous value of the shift flag is "an upward shift," the shift flag is changed to "a downward shift." When the previous value of the shift flag is "the downward shift," the shift flag is changed to "the upward shift."

The count value Cnt is initialized in S105.

The count value Cnt is counted up in S106.

In S107, it is determined whether the shift flag indicates the downward shift. When it is determined that the shift flag is not indicating the downward shift (i.e., when the shift flag is the upward shift) (S107: NO), the process proceeds to S114. When it is determined that the shift flag is indicating the downward shift (S107: YES), the process proceeds to S108.

In S108, it is determined whether the present shift flag differs from the previous value. When it is determined that the present shift flag is the same as the previous value (S108: NO), the process proceeds to S111. When it is determined that the present shift flag is different from the previous value (S108: YES), the process proceeds to S109.

In S109, a target shift amount X0 is calculated. The target shift amount X0 is defined as a shift amount of the duty when a direct switching from the upper limit high-end set modulation to the lower limit low-end set modulation is performed. The target shift amount X0 is represented with an equation (1).

$$X0 = DH - (D1\_max - D1\_min) - DL \qquad \text{Equation (1)}$$
$$= 93 - (D1\_max - D1\_min) - 4$$

In S110, a low pass filter is initialized.

In S111, a filtered value X, which is a value after a low pass filter process of the target shift amount X0, is calculated. The time constant of the low pass filter is mentioned later.

Hereafter, an "equation" may also indicate an "inequation," depending on the context.

In S112, a duty change amount Y is calculated. The duty change amount Y is represented with an equation (2).

$$Y = X0 - X \qquad \text{Equation (2)}$$

Further, in consideration of an amplitude change, the duty change amount Y is restricted so that the first duty instruction values Du1, Dv1, and Dw1 are controlled to be in a range of above the outputtable lower limit value DL and below the outputtable upper limit value DH.

The lower limit of the duty change amount Y is defined by an equation (3).

$$D1\_min - D1\_min + DL + Y \geq DL$$

$$Y \geq 0 \qquad \text{Equation (3)}$$

The upper limit of the duty change amount Y is defined by an equation (4).

$$D1\_max - D1\_min + DL - Y \leq DH$$

$$Y \leq DH - DL - D1\_max + D1\_min$$

$$Y \leq 89 - D1\_max + D1\_min \qquad \text{Equation (4)}$$

In S113, the first duty instruction values Du1, Dv1, and Dw1 are calculated. The first duty instruction values Du1, Dv1, and Dw1 are represented with equations (5-1)-(5-3).

$$Du1 = Du1\_b - D1\_min + DL + Y \qquad \text{Equation (5-1)}$$
$$= Du1\_b - D1\_min + 4 + Y$$

$$Dv1 = Dv1\_b - D1\_min + DL + Y \qquad \text{Equation (5-2)}$$
$$= Dv1\_b - D1\_min + 4 + Y$$

$$Dw1 = Dw1\_b - D1\_min + DL + Y \qquad \text{Equation (5-3)}$$
$$= Dw1\_b - D1\_min + 4 + Y$$

In S114, which is performed when the shift flag is the upward shift (S107: NO), it is determined whether the present shift flag is the same as the previous value. When it is determined that the present shift flag is the same as the previous value (S114: NO), the process proceeds to S117.

When it is determined that the present shift flag is different from the previous value (S114: YES), the process proceeds to S115.

In S115, the target shift amount X0 is calculated. The target shift amount X0 is defined as a shift amount of the neutral point voltage Vn1 when a direction switching from the lower limit low-end set modulation to the upper limit high-end set modulation is performed. The target shift amount X0 is represented with an equation (6).

$$X0=4+(D1\_max-D1\_min)-93 \quad \text{Equation (6)}$$

In S116, the low pass filter is initialized.

In S117, the filtered value X which is a value after the low pass filter process of the target shift amount X0 is calculated. The low pass filter is the same one for the calculation of S111.

In S118, the duty change amount Y is calculated by an equation (2).

Further, in consideration of amplitude change, the duty change amount Y is restricted so that the first duty instruction values Du1, Dv1, and Dw1 are controlled to be in a range of above the outputtable lower limit value DL, and below the outputtable upper limit value DH.

The lower limit of the duty change amount Y is defined by an equation (7).

$$D1 \le \min - D1\_max + DH + Y \ge DL$$

$$Y \ge D1\_max - D1\_min + DL - DH$$

$$Y \ge D1\_max - D1\_min - 89 \quad \text{Equation (7)}$$

The upper limit of the duty change amount Y is represented with an equation (8).

$$D1\_max - D1\_max + DH + Y \le DH$$

$$Y \le 0 \quad \text{Equation (8)}$$

In S119, the first duty instruction values Du1, Dv1, and Dw1 are calculated. The first duty instruction values Du1, Dv1, and Dw1 are represented with equation (9-1)-(9-3).

$$\begin{aligned} Du1 &= Du1\_b - D1\_max + DH + Y \\ &= Du1\_b - D1\_max + 93 + Y \end{aligned} \quad \text{Equation (9-1)}$$

$$\begin{aligned} Dv1 &= Dv1\_b - D1\_max + DH + Y \\ &= Dv1\_b - D1\_max + 93 + Y \end{aligned} \quad \text{Equation (9-2)}$$

$$\begin{aligned} Dw1 &= Dw1\_b - D1\_max + DH + Y \\ &= Dw1\_b - D1\_max + 93 + Y \end{aligned} \quad \text{Equation (9-3)}$$

Figure 6A:
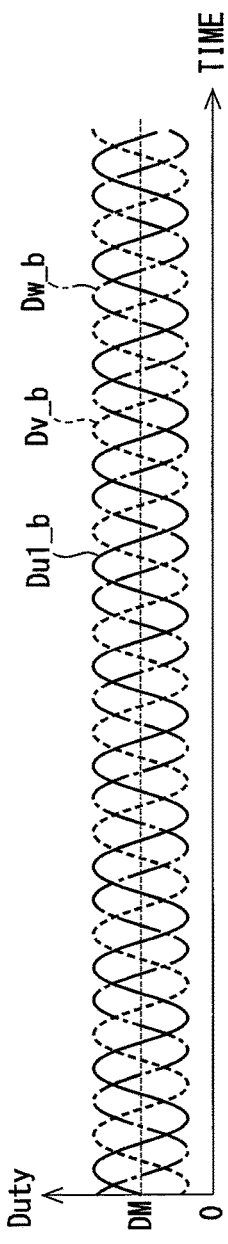
FIGS. 6A/B/C are time diagrams of the switching of the shift directions in the first embodiment of the present disclosure.

The instruction calculation process of the present embodiment is described based on the time diagram of FIGS. 6A/B/C.

Figure 6B:
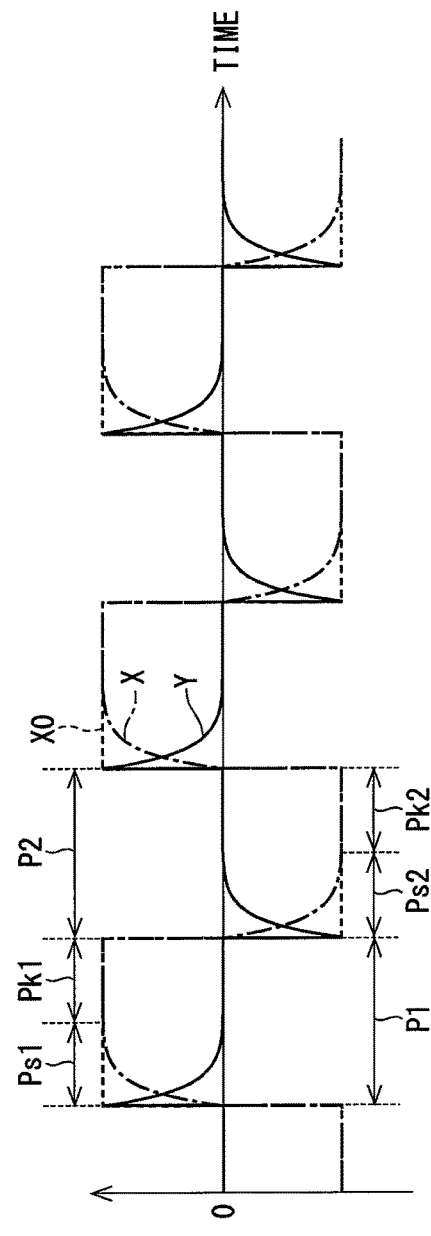
Figure 6C:
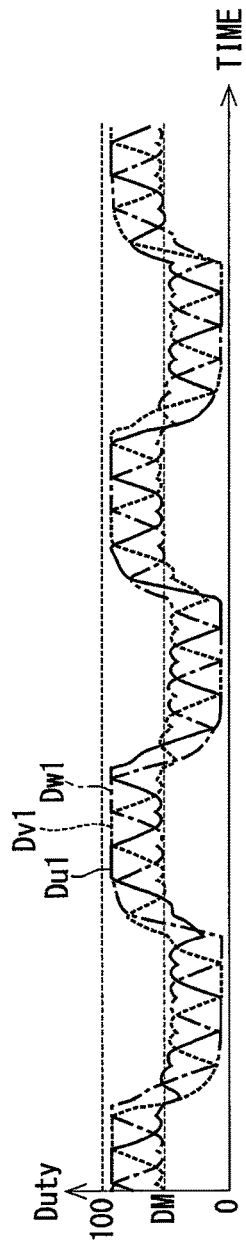

In FIG. 6A, the pre-modulation duty instruction values Du1_b, Dv1_b, Dw1_b are shown, and, in FIG. 6B, the target shift amount X0, the filtered value X, and the duty change amount Y are shown, and, in FIG. 6C, the first duty instruction values Du1, Dv1, and Dw1 are shown.

In FIGS. 6A/B/C, the motor 10 is assumed to be rotating at a speed of a preset number of rotations per unit time.

As shown in FIG. 6B, a first transition period Ps1, during which the first duty instruction values Du1, Dv1, and Dw1 are shifted for a downward shift of the first neutral point voltage Vn1 and a first keep period Pk1, during which the first neutral point voltage Vn1 is kept below the center-of-output value VM first period P1 are collectively designated as a first period P1.

In the present embodiment, the first period P1 is a period when the downward shift flag is set and the first duty instruction values Du1, Dv1, and Dw1 undergo the low-end set modulation. The first transition period Ps1 is a period of transition from one state in which the first duty instruction values Du1, Dv1, and Dw1 undergo the upper limit high-end set modulation process to the other state in which the first duty instruction values Du1, Dv1, and Dw1 undergo the lower limit low-end set modulation process. In the first keep period Pk1, the first duty instruction values Du1, Dv1, and Dw1 undergo the lower limit low-end set modulation process.

Further, a second transition period Ps2, during which the first duty instruction values Du1, Dv1, and Dw1 are shifted for an upward shift of the first neutral point voltage Vn1, and a second keep period Pk2, during which the first neutral point voltage Vn1 is kept above the center-of-output value VM are collectively designated as a second period P2.

In the present embodiment, the second period P2 is a period when the upward shift flag is set and the first duty instruction values Du1, Dv1, and Dw1 undergo the high-end set modulation process. The second transition period Ps2 is a period of transition from one state in which the first duty instruction values Du1, Dv1, and Dw1 undergo the lower limit low-end set modulation process to the other state in which the first duty instruction values Du1, Dv1, and Dw1 undergo the upper limit high-end set modulation process. In the second keep period Pk2, the first duty instruction values Du1, Dv1, and Dw1 undergo the upper limit high-end set modulation process.

Even though not illustrated in FIGS. 6A/B/C, regarding the second system 102, the second duty instruction values Du2, Dv2, and Dw2 are shifted for an upward shift of the second neutral point voltage Vn2 in the first transition period Ps1, and the second neutral point voltage Vn2 is kept above the center-of-output value VM in the first keep period Pk1. Further, the second duty instruction values Du2, Dv2, and Dw2 are shifted for a downward shift of the second neutral point voltage Vn2 in the second transition period Ps2, and the second neutral point voltage Vn2 is kept below the center-of-output value VM in the second keep period Pk2.

In the first keep period Pk1 and the second keep period Pk2, if the amplitude of the duty instruction values Du1, Dv1, Dw1, Du2, Dv2, and Dw2 is constant, the first and second neutral point voltages Vn1 and Vn2 stays at a constant value. When the amplitude changes, however, the neutral point voltages Vn1 and Vn2 change according to the amplitude change.

According to the present embodiment, in the first period P1, the first duty instruction values Du1, Dv1, and Dw1 undergo the low-end set modulation, and the second duty instruction values Du2, Dv2, and Dw2 undergo the high-end set modulation process. Further, in the first keep period Pk1, the first duty instruction values Du1, Dv1, and Dw1 undergo the lower limit low-end set modulation process, and the second duty instruction values Du2, Dv2, and Dw2 undergo the upper limit high-end set modulation process.

In the second period P2, the first duty instruction values Du1, Dv1, and Dw1 undergo the high-end set modulation process, and the second duty instruction values Du2, Dv2, and Dw2 undergo the low-end set modulation. Further, in the second keep period Pk2, the first duty instruction values Du1, Dv1, and Dw1 undergo the upper limit high-end set modulation process, and the second duty instruction values Du2, Dv2, and Dw2 undergo the lower limit low-end set modulation process.

As shown in FIG. 6A, the pre-modulation duty instruction values Du1_b, Dv1_b, and Dw1_b are three-phase sine waves.

As shown in FIG. 6B, the first period P1 and the second period P2 are switched at an interval of the switch period Pc. The switch period Pc may be defined as a specific period of time during which a difference of element temperatures due to the unevenness of the electric currents flowing in the SW elements 211-216 is kept within, or is not allowed to exceed, a preset value (e.g., several degrees of Celsius), that is, for example, the switch period Pc may be set as 100 ms or as several hundred ms. The switch period Pc may be set as a specified value that is set up in advance.

Further, the switch period Pc may vary according to an electric current integrated value Is (i.e., the first period P1 and the second period P2 may be switched when the electric current integrated value Is exceeds a determination threshold value Ith). The electric current integrated value Is may be defined as an integrated value of the electric current detection values Iu1, Iv1, Iw1, Iu2, Iv2, and Iw2 detected by the electric current detectors 26 and 27, or the electric current integrated value Is may be calculated as an integrated value of the electric currents supplied to each of the SW elements 211-216 (i.e., may be calculated as an integrated value of the SW element electric currents).

Further, in the present embodiment, the ripple of the electric current is reduced by not instantly shifting the first neutral point voltage Vn1 to a desired value, but by gradually shifting the neutral point voltage Vn1 by setting the transition periods Ps1, Ps2, when switching between the first period P1 and the second period P2.

According to the present embodiment, when the duty change amount Y falls down to 0, or falls down to a value that is substantially equal to 0, it is considered that the neutral point voltages Vn1 and Vn2 have reached the desired value, and is considered as an end of the transition periods Ps1 and Ps2.

Further, the duty change amount Y in the transition periods Ps1 and Ps2 is calculated based on the target shift amount X0 and the filtered value X of the target shift amount X0. In such case, by setting a time constant of the low pass filter to be greater than a time constant of responsiveness of the electric current control (e.g., about 100 Hz≈about several ms), an electric current ripple component accompanying the shift of the neutral point voltage Vn1 is absorbed by the electric current control. Further, by setting a time constant of the low pass filter to be greater than a time constant of the motor, the torque ripple accompanying the shift of the neutral point voltage Vn1 is reduced.

The electric current ripple accompanying the switching is reduced by a greater amount by increasing the time constant of the low pass filter and extending the transition periods Ps1 and Ps2, which means that the neutral point voltage Vn1 is shifted slowly. However, the time constant of the low pass filter is suitably set up so that the transition periods Ps1 and Ps2 are respectively equal to or less than the switch period Pc.

As shown in FIG. 6C, when the transition periods Ps1 and Ps2 are set, and the time constant of switching of the neutral point voltages Vn1 and Vn2 is set to be greater than a preset time constant at a switching time of the state A and the state B, the first duty instruction values Du1, Dv1, and Dw1 are changed smoothly. Thereby, without causing a sudden change of the neutral point voltages Vn1 and Vn2, which means that the voltages Vn1 and Vn2 change smoothly, the ripple of the electric current is reduced.

As described in full details above, the power converter 1 of the present embodiment converts the electric power for the motor 10, which has the first winding group 11 and the second winding group 12, and the converter 1 is provided with the first inverter 21, the second inverter 22, and the controller 40.

The first inverter 21 includes the first SW elements 211-216 provided in corresponding manner to each of the plural phases of the first winding group 11.

The second inverter 22 includes the second SW elements 226-226 provided in corresponding manner to each of the plural phases of the second winding group 12.

The controller 40 has the duty calculators 415 and 425, which calculate the first duty instruction values Du1, Dv1, Dw1 concerning the voltage applied to the first winding group 11, and the second duty instruction values Du2, Dv2, and Dw2.

The first period P1 is defined as a period in which the first neutral point voltage Vn1 is shifted downward to be below the center-of-output value VM of the outputtable voltage range, and the second neutral point voltage Vn2 is shifted upward to be above the center-of-output value VM of the outputtable voltage range.

The second period P2 is defined as a period in which the first neutral point voltage Vn1 is shifted upward to be above the center-of-output value VM of the outputtable voltage range, and the second neutral point voltage Vn2 is shifted downward to be below the output median value VM of the outputtable voltage range.

According to the present embodiment, the first period P1 is a period of the low-end set modulation including the transition period Ps1, and the second period P2 is a period of the high-end set modulation including the transition period Ps2. In other words, the first period P1 includes the transition period Ps1 during which (i) the first neutral point voltage Vn1 is being shifted downward in a voltage range higher than the center-of-output value VM, and (ii) the second neutral point voltage Vn2 is being shifted upward yet in a voltage range lower than the center-of-output value VM. Similarly, the second period P2 includes the transition period Ps2 during which (i) the first neutral point voltage Vn1 is being shifted upward yet in a voltage range lower than the center-of-output value VM, and (ii) the second neutral point voltage Vn2 is being shifted downward yet in a voltage range higher than the center-of-output value VM. Further, in the first period P1, a temporary upward shift of the first neutral point voltage Vn1 due to the amplitude change and/or a temporary downward shift of the second neutral point voltage Vn2 due to the amplitude change (i.e., temporary changes of the shift directions) are disregarded, and the first period P1 is considered as continuing regardless of such temporary changes of the shift directions. The same applies to the second period P2.

When the duty calculators 415 and 425 switch the first period P1 and the second period P2 at an interval of the switch period Pc, the duty calculators 415, 425 calculate the first duty instruction values Du1, Dv1, Dw1 and the second duty instruction values Du2, Dv2, Dw2, so that the time constant of the change of the first neutral point voltage Vn1, and the second neutral point voltage Vn2 in the first period P1 and in the second period P2 is greater than the preset time constant.

More practically, the duty instruction values Du1, Dv1, Dw1, Du2, Dv2, Dw2 are calculated (i) by setting the time constant of the filter process for filtering the target shift amount X0 to be greater than the preset time constant, and (ii) by using the filtered value X after the filter process.

According to the present embodiment, two states are switched (i.e., alternated), at an interval of the switch period Pc, (i.e., one state in which the first neutral point voltage Vn1 is shifted above the center-of-output value VM, and the second neutral point voltage Vn2 is shifted below the center-of-output value VM; and the other state in which the first neutral point voltage Vn1 is shifted below the center-of-output value VM, and the second neutral point voltage Vn2 is shifted above the center-of-output value VM). In such manner, the uneven heat generation among the SW elements 211-216 and 221-226 is reduced.

Further, when switching between the first period P1 and the second period P2, the duty calculators 415, 425 increase the time constant of the change of the first neutral point voltage Vn1, and the second neutral point voltage Vn2 is increased to be greater than the preset time constant, so that the first neutral point voltage Vn1 and the second neutral point voltage Vn2 respectively change gradually according to the first voltage instruction value and the second voltage instruction value calculated by the duty calculators 415, 425.

Therefore, the ripple of the electric current accompanying the switching between the first period P1 and the second period P2 is reduced, thereby reducing the torque ripple, the vibration, and/or the sound.

The preset time constant is a value according to the responsiveness of the control in the controller 40. By increasing the time constant of the change of the neutral point voltages Vn1 and Vn2 to be greater than the responsiveness of the electric current control, the electric current ripple component accompanying the switching between the first period P1 and the second period P2 is reduced by the electric current control.

The preset time constant is the time constant of the motor 10. By increasing the time constant of the change of the neutral point voltage Vn1 to be greater than the time constant of the motor 10, the torque ripple accompanying the switching between the first period P1 and the second period P2 is reduced.

The preset time constant is a value which controls the transition periods Ps1 and Ps2, which are respectively a period until the first neutral point voltage Vn1 and the second neutral point voltage Vn2 reach the target value, to be equal to or less than the switch period Pc. By using such time constant, the switching between the first period P1 and the second period P2 is appropriately completed within the switch period Pc.

The switch period Pc is defined as a specific period of time during which a difference of element temperatures among the first SW elements 211-216 and the second SW elements 221-226 is kept within, or is not allowed to exceed, a preset value. By such setting of the switch period Pc, the unevenness of heat generation among the SW elements is reduced.

Further, the switch period Pc may be a variable value according to the electric current integrated value Is. In such manner, the unevenness of heat generation among the SW elements is more appropriately reduced.

According to the present embodiment, the duty calculators 415 and 425 correspond to an "instruction calculator". The first duty instruction values Du1, Dv1, Dw1 correspond to a "first voltage instruction value", and the second duty instruction values Du2, Dv2, Dw2 correspond to a "second voltage instruction value."

Second Embodiment

Figure 7:
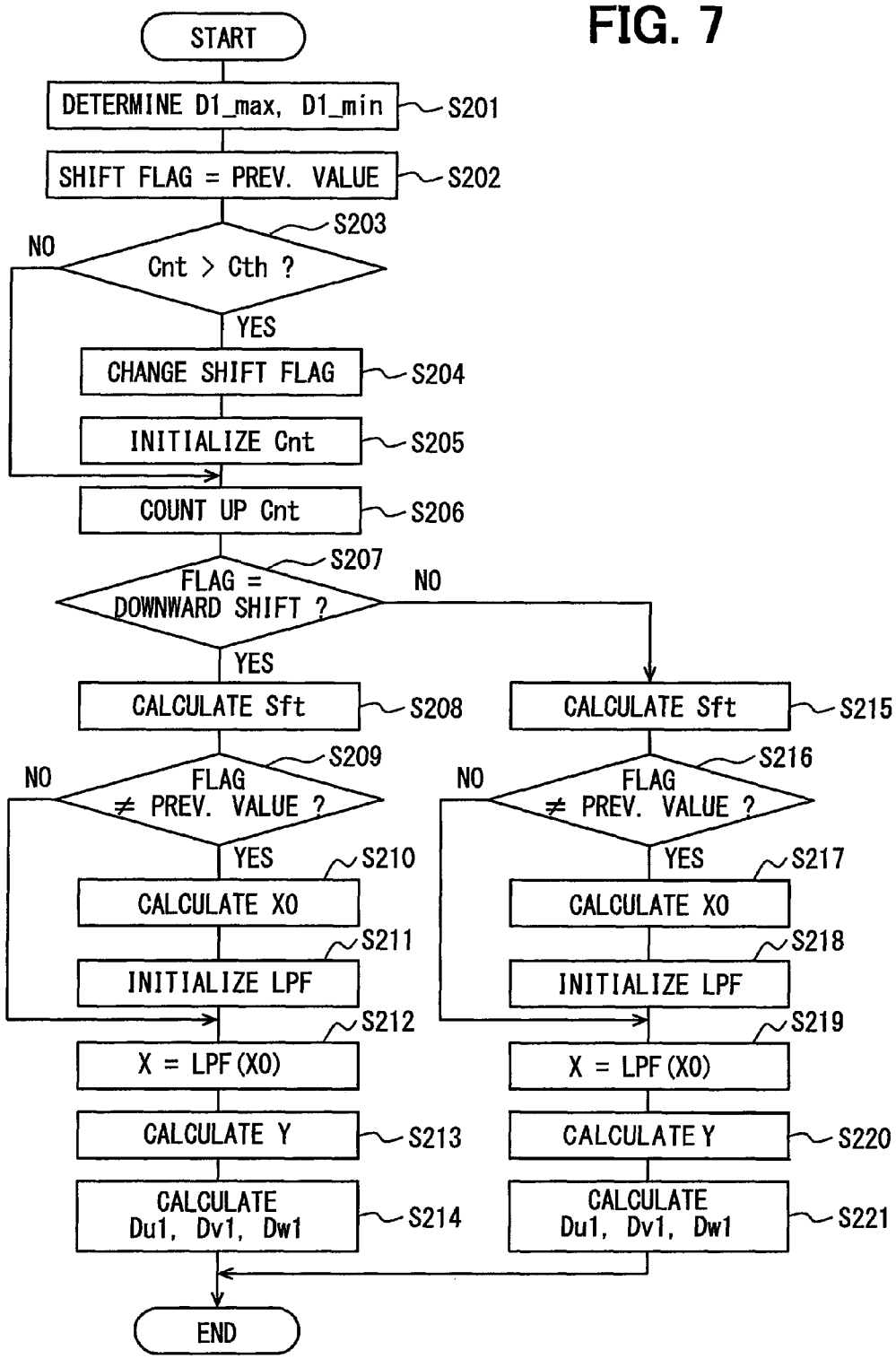
FIG. 7 is a flowchart of the instruction calculation process in a second embodiment of the present disclosure.

The second embodiment of the present disclosure is described based on FIG. 7. The instruction calculation process in the duty calculator 415 is changed in the present embodiment, which is described as a focus in the following description.

According to the first embodiment, one of two groups of the instruction values (i.e., the first duty instruction values Du1, Dv1, Dw1 and the second duty instruction values Du2, Dv2, Dw2) undergoes the high-end set modulation process, and the other undergoes the low-end set modulation process.

According to the present embodiment, without performing the modulation process (i.e., the signal is kept in a three-phase sine curve form), one of the first neutral point voltage Vn1 and the second neutral point voltage Vn2 is shifted above the center-of-output, while the other is shifted below the center-of-output, by the shifting of the duty instruction values Du1, Dv1, Dw1, Du2, Dv2, and Dw2.

The instruction calculation process of the present embodiment is described based on a flowchart shown in FIG. 7. The process of FIG. 7 is performed at the predetermined intervals by the duty calculator 415, just like the process of FIG. 5. The process is described with a focus on the first duty instruction values Du1, Dv1, and Dw1.

The process of S201-S207 is the same as the process of S101-S107 in FIG. 5. When it is determined that the shift flag is not the downward shift flag (i.e., when the shift flag indicates the upward shift) (S207: NO), the process proceeds to S215. When it is determined that the shift flag is the downward shift flag (S207: YES), the process proceeds to S208.

In S208, a shift amount Sft is calculated. The shift amount Sft is a difference between the first neutral point voltage conversion value Dn1 and the center-of-output duty DM in the present amplitude, and is represented with an equation (10).

$$Sft = |Dn1 - DM| \qquad \text{Equation (10)}$$

S209 is the same as S108 in FIG. 5, and it is determined whether the present shift flag is different from the previous value. When it is determined that the present shift flag is the same as the previous value (S209: NO), the process proceeds to S212. When it is determined that the present shift flag is different from the previous value (S209: YES), the process proceeds to S210.

In S210, the target shift amount X0 is calculated.

The target shift amount X0 is represented with an equation (11).

$$X0 = 2 \times Sft \qquad \text{Equation (11)}$$

S211 and S212 are the same as S110 and S111 in FIG. 5.

In S213, the duty change amount Y is calculated by the equation (2).

Further, in consideration of the amplitude change, the duty change amount Y is restricted so that the first duty instruction values Du1, Dv1, Dw1 are controlled to be in a range of above the outputtable lower limit value DL and below the outputtable upper limit value DH.

The lower limit of the duty change amount Y is defined by an equation (12).

$$D1\_min - Sth + Y \geq DL$$

$$Y \geq DL + Sft - D1\_min$$

$$Y \geq 4 + Sft - D1\_min \qquad \text{Equation (12)}$$

The upper limit of the duty change amount Y is defined by an equation (13).

$$D1\_max - Sft + Y \leq DH$$

$Y \leq DH - D1\_max + Sft$ $Y \leq 93 - D1\_max + Sft$ \hfill Equation (13)

In S214, the first duty instruction values Du1, Dv1, and Dw1 are calculated. The first duty instruction values Du1, Dv1, and Dw1 are represented with equations (14-1)-(14-3).

$Du = Du1\_b - Sft + Y$ \hfill Equation (14-1)

$Dv = Dv1\_b - Sft + Y$ \hfill Equation (14-2)

$Dw = Dw1\_b - Sft + Y$ \hfill Equation (14-3)

In S215, which is performed when the shift flag is the upward shift (S207: NO), the shift amount Sft is calculated by an equation (11), just like in S210.

The process of S216-S219 is the same as the process of S209-S212.

In S220, the duty change amount Y is calculated by the equation (2).

Further, in consideration of amplitude change, the duty change amount Y is restricted so that the first duty instruction values Du1, Dv1, and Dw1 are controlled to be in a range of above the outputtable lower limit value DL and below the outputtable upper limit value DH.

The lower limit of the duty change amount Y is defined by an equation (15).

$D1\_min + Sft - Y \geq DL$ $Y \geq DL - Sft - D1\_min$ $Y \geq 4 - Sft - D1\_min$ \hfill Equation (15)

The upper limit of the duty change amount Y is defined by an equation (16).

$D1\_max + Sft - Y \leq DH$ $Y \leq DH - D1\_max - Sft$ $Y \leq 93 - D1\_max - Sft$ \hfill Equation (16)

In S221, the first duty instruction values Du1, Dv1, and Dw1 are calculated. The first duty instruction values Du1, Dv1, and Dw1 are represented with equations (17-1)-(17-3).

$Du = Du1\_b + Sft - Y$ \hfill Equation (17-1)

$Dv = Dv1\_b + Sft - Y$ \hfill Equation (17-2)

$Dw = Dw1\_b + Sft - Y$ \hfill Equation (17-3)

According to the present embodiment, without performing the modulation process, one of the first duty instruction values Du1, Dv1, Dw1 and the second duty instruction values Du2, Dv2, Dw2 in the three-phase sine wave form is shifted in the downward direction, while shifting the other in the upward direction.

Even when such a shifting scheme is implemented, the same effects as the above-mentioned embodiment are achieved.

Third Embodiment

Figure 8:
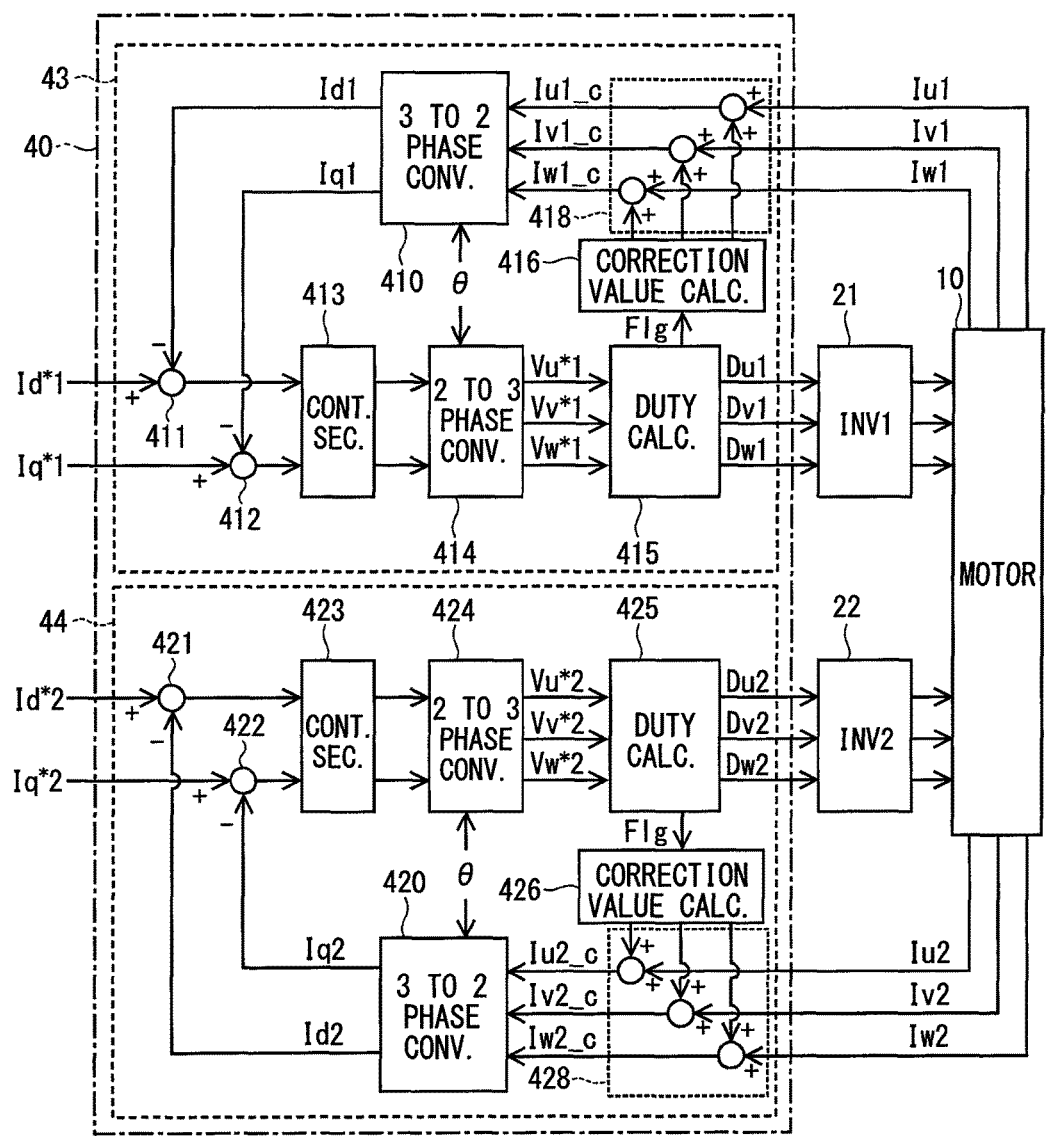
FIG. 8 is a block diagram of the controller in a third embodiment of the present disclosure.

The third embodiment of the present disclosure is described based on FIG. 8.

According to the present embodiment, just like the above-mentioned embodiment, the duty instruction values Du1, Dv1, Dw1, Du2, Dv2, Dw2 are calculated so that one the first neutral point voltage Vn1, and the second neutral point voltage Vn2 rises above the center-of-output value VM, and the other falls below the value VM.

The calculation of the duty instruction values Du1, Dv1, Dw1, Du2, Dv2, Dw2 may be performed with the modulation process in the first embodiment, or may be performed without the modulation process, just like the second embodiment. The same may apply to the fourth embodiment.

A first instruction calculator 43 of the present embodiment has a correction value calculator 416 and an adder 418, in addition to each of the function blocks of the first instruction calculator 41 of the above-mentioned embodiment.

The shift flag calculated by the duty calculator 415 is inputted to the correction value calculator 416. The correction value calculator 416 calculates first electric current correction values Cu1, Cv1, and Cw1 for correcting the first electric current detection values Iu1, Iv1, Iw1 detected by the first electric current detector 26. The first electric-electric current correction values Cu1, Cv1, and Cw1 are calculated by a map calculation etc., according to the shift flag.

In the adder 418, the first electric current correction values Cu1, Cv1, and Cw1 are added to the first electric current detection values Iu1, Iv1, and Iw1, and after-correction electric current detection values Iu1_c, Iv1_c, and Iw1_c are calculated.

In the 3-to-2 phase converter 410, a dq conversion of the after-correction electric current detection values Iu1_c, Iv1_c, and the Iw1_c is performed, and the d axis electric current detection value Id1 and the q axis electric current detection value Iq1 are calculated.

According to the present embodiment, it is understood that the electric current correction values Cu1, Cv1, and Cw1 are used for changing the correction value that corrects the offset error according to the shift flag.

Here, the correction value calculator 416 may also be configured (i) to calculate a correction value that corrects a gain error according to the shift flag, and (ii) to correct the gain error of the electric current detection values Iu1, Iv1, Iw1, for the calculation of the after-correction electric current detection values Iu1_c, Iv1_c, and Iw1_c. The same applies to the after-correction electric current detection values Iu2_c, Iv2_c, Iw2_c, and the fourth embodiment.

A second instruction calculator 44 has a correction value calculator 426 and an adder 428, in addition to each of the function blocks of the second instruction calculator 42 of the above-mentioned embodiment.

The correction value calculator 426 of the second instruction calculator 44 calculates second electric current detection values Cu2, Cv2, Cw2 for correcting the second electric current correction values Iu2, Iv2, Iw2 detected by the second electric current detector 27. The second electric current correction values Cu2, Cv2, Cw2 are calculated by a map calculation etc., according to the shift flag.

In the adder 428, the second the electric current correction values Cu2, Cv2, Cw2 are added to the second electric current detection values Iu2, Iv2, and Iw2, for the calculation of after-correction electric current detection values Iu2_c, Iv2_c, and Iw2_c.

In a 3-to-2 phase converter 420, a dq conversion of the after-correction electric current detection values Iu2_c, Iv2_c, and the Iw2_c is performed, and the d axis electric current detection value Id2 and the q axis electric current detection value Iq2 are calculated.

According to the present embodiment, the power converter 1 has the electric current detectors 26 and 27 that detect the electric current flowing in each of the plural phases of the first winding group 11, and the second winding group 12.

The controller 40 has the correction value calculators 416 and 426 and the adders 418 and 428.

The correction value calculators 416 and 426 change the correction values Cu1, Cv1, Cw1, Cu2, Cv2, Cw2 that correct the electric current detection values Iu1, Iv1, Iw1, Iu2, Iv2, Iw2 obtained from the electric current detectors 26 and 27 according to the shift direction of the first neutral point voltage Vn1, or the shift direction of the second neutral point voltage Vn2.

More specifically, the correction value calculator 416 changes the correction values Cu1, Cv1, Cw1 that correct the electric current detection values Iu1, Iv1, Iw1 obtained from the electric current detector 26 according to the shift direction of the first neutral point voltage Vn1. The correction value calculator 426 changes the correction values Cu2 Cv2, Cw2 that correct the electric current detection values Iu2, Iv2, Iw2 obtained from electric current detector 27, according to the shift direction of the second neutral point voltage Vn2.

The adders 418 and 428 correct the electric current detection values Iu1, Iv1, Iw1, Iu2, Iv2, Iw2 based on the correction values Cu1, Cv1, Cw1, Cu2, Cv2, Cw2.

Thereby, the offset error, the gain error, and the like in the electric current detection values Iu1, Iv1, Iw1, Iu2, Iv2, Iw2 are appropriately corrected according to the shift direction.

Further, the duty calculators 415 and 425 calculate the duty instruction values Du1, Dv1, Dw1, Du2, Dv2, Dw2 based on the after-correction electric current detection values Iu1_c, Iv1_c, Iw1_c, Iu2_c, Iv2_c, Iw2_c, which are derived by correcting the values Iu1, Iv1, Iw1, Iu2, Iv2, Iw2, thereby enabling a more-appropriate calculation of the duty instruction values Du1, Dv1, Dw1, Du2, Dv2, and Dw2.

The same effects as the above-mentioned embodiment are also achieved.

According to the present embodiment, the correction value calculators 416 and 426 correspond to a "correction value calculator," and the adders 418 and 428 correspond to a "corrector."

Fourth Embodiment

Figure 9:
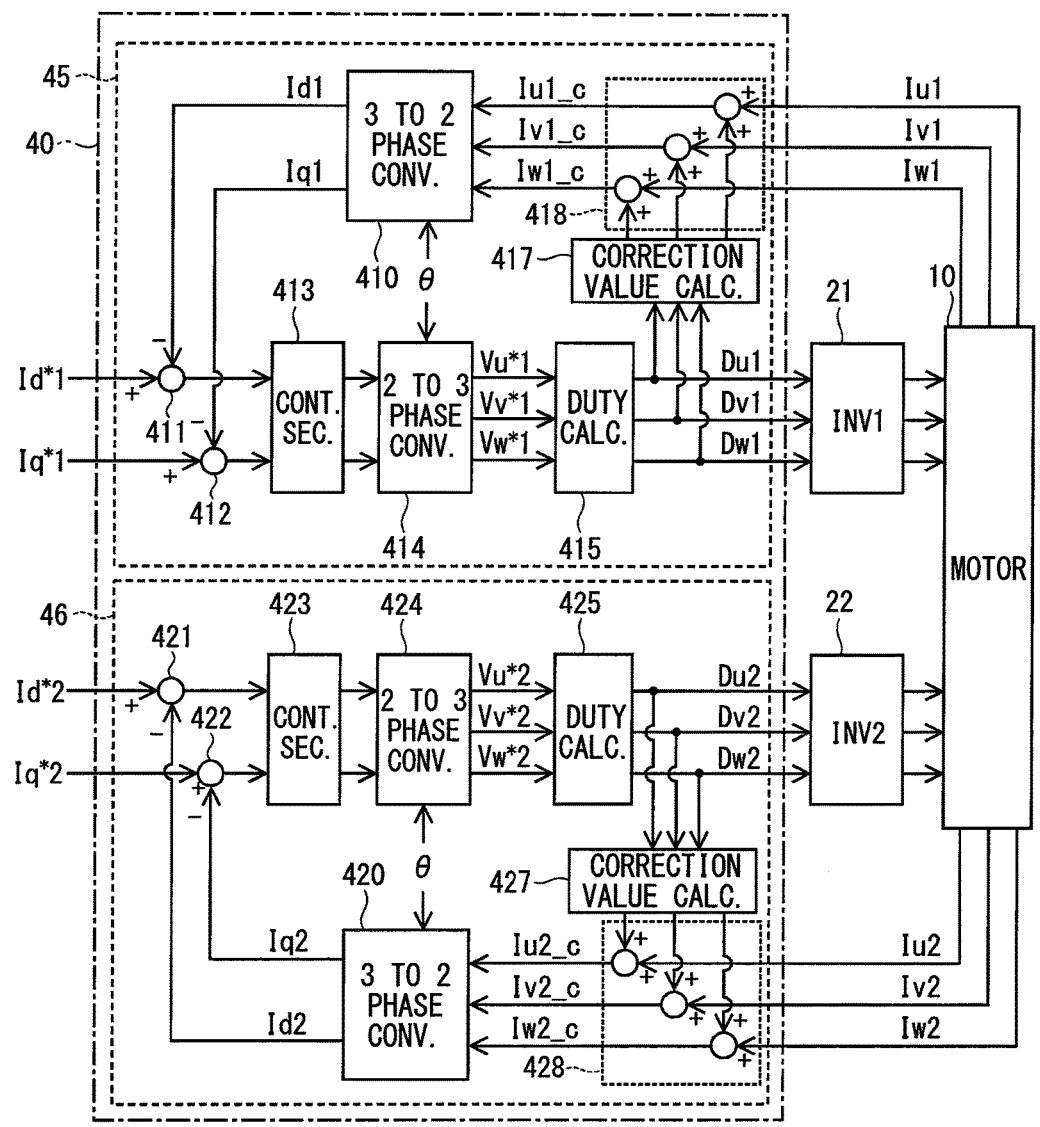
FIG. 9 is a block diagram of the controller in a fourth embodiment of the present disclosure.

The fourth embodiment of the present disclosure is described based on FIG. 9.

The first instruction calculator 45 of the present embodiment has, instead of having the correction value calculator 416 of the third embodiment, a correction value calculator 417. The second instruction calculator 46 of the present embodiment has, instead of having the correction value calculator 426 of the third embodiment, a correction value calculator 427.

The first duty instruction values Du1, Dv1, and Dw1 calculated by the duty calculator 415 are inputted to the correction value calculator 417. The correction value calculator 417 calculates the first electric current correction values Cu1, Cv1, and Cw1 by a map calculation etc., according to the first duty instruction values Du1, Dv1, and Dw1

The second duty instruction values Du2, Dv2, and Dw2 calculated by the duty calculator 425 are inputted to the correction value calculator 427. The correction value calculator 427 calculates the second electric current correction values Cu2, Cv2, and Cw2 by a map calculation etc., according to the second duty instruction values Du2, Dv2, and Dw2.

In such manner, the electric current detection value is more appropriately corrected.

According to the present embodiment, the power converter 1 includes the electric current detectors 26 and 27 that detect the electric current flowing in each of the plural phases of the first winding group 11 and the second winding group 12.

The controller 40 has the correction value calculators 417 and 427 and the adders 418 and 428.

The correction value calculators 417 and 427 calculate the correction values Cu1, Cv1, Cu1, Cu2, Cv2, Cw2 which corrects the electric current detection values Iu1, Iv1, Iw1, Iu2, Iv2, Iw2 obtained from the electric current detectors 26 and 27, based on the duty instruction values Du1, Dv1, Dw1, Du2, Dv2, and Dw2.

The adders 418 and 428 correct the electric current detection value Iu1, Iv1, Iw1, Iu2, Iv2, and Iw2 based on the correction values Cu1, Cv1, Cw1, Cu2, Cv2, and Cw2.

In such manner, the offset error and/or the gain error are appropriately corrected according to the duty instruction values Du1, Dv1, Dw1, Du2, Dv2, and Dw2.

Further, based on the after-correction electric current detection values Iu1_c, Iv1_c, Iw1_c, Iu2_c, Iv2_c, and Iw2_c, which are derived by correcting the values Iu1, Iv1, Iw1, Iu2, Iv2, and Iw2, the duty calculators 415 and 425 calculate the duty instruction values Du1, Dv1, Dw1, Du2, Dv2, and Dw2, which enable a more-appropriate calculation of the duty instruction values Du1, Dv1, Dw1, Du2, Dv2, and Dw2.

The same effects as the above-mentioned embodiment are also achieved.

According to the present embodiment, the correction value calculators 417 and 427 correspond to a "correction value calculator," and the adders 418 and 428 correspond to a "corrector."

Other Embodiments (a) Instruction Calculator

According to the above-mentioned embodiments, the first duty instruction values calculated by the duty calculator correspond to a "first voltage instruction value," and the second duty instruction values calculated by the duty calculator correspond to a "second voltage instruction value."

According to other embodiments, pre-duty-conversion voltage instruction values may undergo a shift process, and the after-shift voltage instruction values after the shift process may be converted to the duty.

The same may apply to the modulation process. That is, the voltage instruction values before the duty conversion may be considered as the first voltage instruction value and the second voltage instruction value, for example, and the function blocks such as a modulation processor and a shift processor may be disposed, in the first embodiment, at a position between (i) the controllers 413 and 423, and (ii) the duty calculators 415 and 425. In such case, the modulation processor and the shift processor correspond to an "instruction calculator."

In the above-mentioned embodiment, the time constant of the low pass filter, which performs filtering of the target shift amount, is the preset time constant.

According to other embodiments, in consideration of the point that the responsiveness of the motor changes according to the size of the electric current, the time constant may be a variable value according to the size of the electric current. Here, "the size of the electric current" may indicate a value that is based on the electric current detection value, or based on the electric current instruction value.

According to the above-mentioned embodiments, the target shift amount is filtered.

According to other embodiments, by using after-filtering other parameters other than the target shift amount, the calculation of the first voltage instruction value and the second voltage instruction value may be configured to control the time constant of the change of the first neutral point voltage, and the second neutral point voltage to be greater than the preset time constant.

(b) Correction Value Calculator

According to the fourth embodiment, the correction value calculator may consider the duty instruction value as being substantially equal to a "voltage instruction value," and calculates the electric current correction value based on the duty instruction value.

According to other embodiments, instead of using the duty instruction value, the electric current correction value may be calculated based on the voltage instruction values in the three phases.

Further, the voltage instruction value may be a d/q axis converted value, instead of the voltage instruction values in three phases. In such case, after d/q axis conversion electric current detection values converted by the 3-to-2 phase converter may be corrected.

(c) Electric Current Detector

According to the above-mentioned embodiments, the electric current detector is a shunt resistor, and is disposed at a position on the low potential side of the low potential side SW element.

According to other embodiments, the electric current detector may be not necessarily the shunt resistor, but a Hall IC, etc., for example.

Further, according to other embodiments, the electric current detector may be disposed at various positions other than the low potential side of the low potential side SW element, such as a position on the high potential side of the high potential side SW element, a position between the winding group and the inverter or the like.

(d) Rotating Electric Machine

In the above-mentioned embodiments, the rotating electric machine is the brushless motor having the three phases.

In other embodiments, the polyphase rotating electric machine other than having the three phases (e.g., having four phases or more) may also be usable.

Further, other than the brushless motor, any motor may also be usable.

Further, the rotating electric machine may be not only a motor but a generator, and may be a motor-generator having the functions of the electric motor and of the generator.

According to the above-mentioned embodiments, the rotating electric machine is applied to an electric power steering apparatus.

According to other embodiments, the rotating electric machine may be applied to devices other than the electric power steering apparatus.

(e) Switch Cycle

The switch period, or more specifically, the switch cycle may be set up for avoiding the resonance frequency that may structurally be defined either by the rotating electric machine or the electric power steering apparatus.

Further, the switch cycle may be not necessarily set to a certain constant value, but may also be set to have a 125 ms cycle first, then may be switched to a 100 ms cycle, and then may be switched to a 175 ms cycle, then may be switched to a 125 ms cycle again. The lowest common multiple of those switch cycles may be controlled to be a large number, preferably. In other words, the switch periods having different time length may be arranged in series to make a switch cycle. In such manner, the ripple of the electric current is reduced, as well as reducing the vibration and the noise.

Although the present disclosure has been described in connection with preferred embodiment thereof with reference to the accompanying drawings, it is to be noted that various changes and modifications will become apparent to those skilled in the art, and such changes, modifications, and summarized schemes are to be understood as being within the scope of the present disclosure as defined by appended claims.

What is claimed is:

1. A power converter for converting an electric power supplied to a rotation electric machine that has a first winding group and a second winding group, the power converter comprising:
    a first inverter having a first switching element respectively corresponding to plural phases in the first winding group;
    a second inverter having a second switching element respectively corresponding to plural phases in the second winding group;
    a controller that includes an instruction calculator calculating a first voltage instruction value that is applied to the first winding group, and a second voltage instruction value that is applied to the second winding group, wherein
    the instruction calculator calculates the first voltage instruction value and the second voltage instruction value in a voltage instruction switching scheme, for switching between a first period and a second period at a preset switch period when the voltage instruction switching scheme is implemented by the instruction calculator during which, (i) in the first period, a first neutral point voltage is shifted downward to be below a center-of-output value of an outputtable voltage range, and a second neutral point voltage is shifted upward to be above the center-of-output value of the outputtable voltage range; and (ii) in the second period, the first neutral point voltage is shifted to be above the center-of-output value of the outputtable voltage range, and the second neutral point voltage is shifted to be below the output median value of the outputtable voltage range, so that a time constant of change of each of the first neutral point voltages and second neutral point voltages becomes greater than a preset time constant.

2. The power converter of claim 1, wherein
the preset time constant is set according to a responsiveness of control that is performed by the controller.

3. The power converter of claim 1, wherein
the preset time constant is a time constant of the rotating electric machine.

4. The power converter of claim 1, wherein
the preset time constant is set to a value that controls a transition period for a transition of the first neutral point voltage and the second neutral point voltage to a target value to be equal to or shorter than the preset switch period.

5. The power converter of claim 1, wherein
the switch period is set to control a temperature difference among the first switching elements and the second switching elements to be equal to or less than a preset value.

6. The power converter of claim 1, wherein
the switch period is variable according to an electric current integrated value.

7. The power converter of claim 1, further comprising:
an electric current detector detecting an electric current flowing in each phase of the first winding group and the second winding group, wherein
the controller includes:
- a correction value calculator changing a correction value for correcting an electric current detection value obtained from the electric current detector according to a shift direction of the first neutral point voltage, or according to a shift direction of the second neutral point voltage; and
- a corrector correcting the electric current detection value based on the correction value, and the instruction calculator calculates the first voltage instruction value and the second voltage instruction value based on the corrected electric current value that is corrected by the corrector.

8. The power converter of claim 1, further comprising:
an electric current detector detecting an electric current flowing in each phase of the first winding group and the second winding group, wherein
the controller includes:
- a correction value calculator calculating a correction value for correcting an electric current detection value obtained from the electric current detector based on the first voltage instruction value, or the second voltage instruction value; and
- a corrector correcting the electric current detection value based on the correction value, and the instruction calculator calculates the first voltage instruction value and the second voltage instruction value based on the corrected electric current value that is corrected by the corrector.

* * * * *